Aug. 28, 1928.
L. LIFSCHUTZ
1,682,134
CIRCUIT CLOSER FOR COLLISION INDICATING DEVICES
Filed April 21, 1923
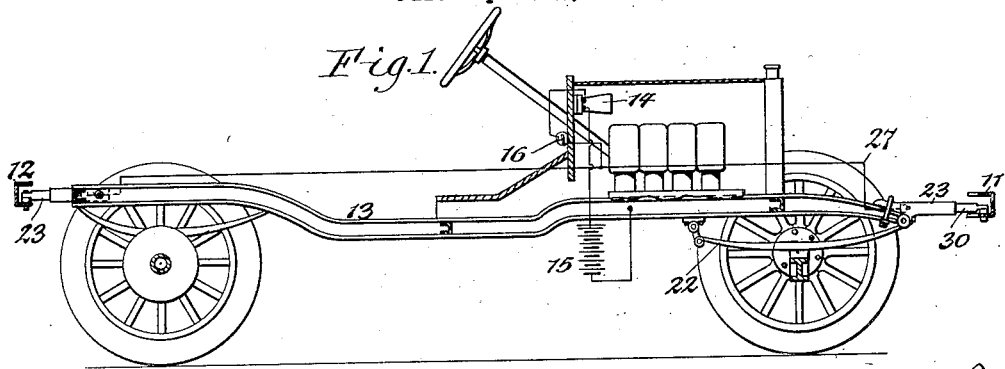
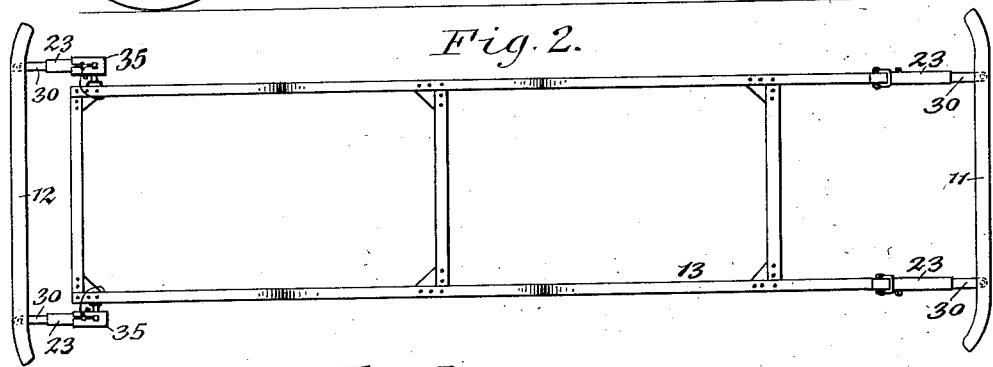
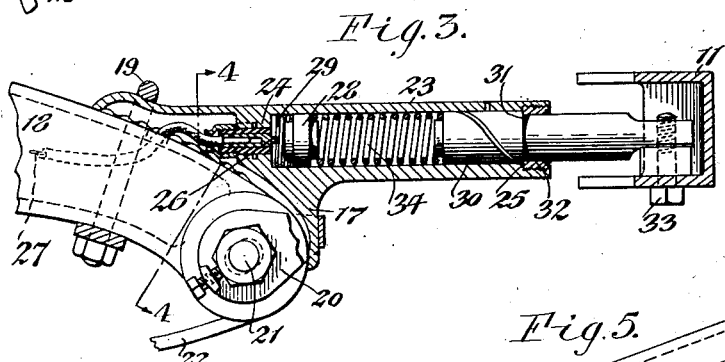
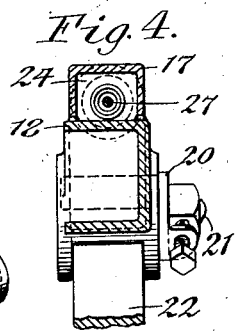
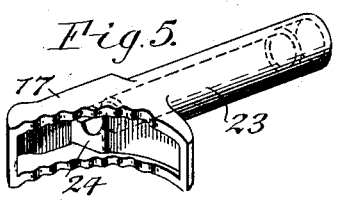
Inventor
Louis Lifschutz
by Theodore L. Popp
Attorney Patented Aug. 28, 1928.

1,682,134

UNITED STATES PATENT OFFICE.

LOUIS LIFSCHUTZ, OF BUFFALO, NEW YORK.

CIRCUIT CLOSER FOR COLLISION-INDICATING DEVICES.

Application filed April 21, 1923. Serial No. 633,711.

This invention relates to a circuit closer for a collision indicating device for automobiles and other vehicles, which will operate to give an audible signal to the driver of the car when the same comes in contact with another automobile or object, this being particularly desirable for use when operating the car in crowded quarters, for instance, when alternately advancing and backing up the car in order to get in or out of a narrow or cramped parking space.

It is the object of this invention to provide a device of this character which is comparatively simple and inexpensive in construction, which is reliable and efficient in operation and which can be readily and conveniently applied to the standard types of automobiles now in general use, without requiring any alteration in construction and permit of using the various types of buffers or bumpers now in common use.

In the accompanying drawings:

Figure 1 is a vertical longitudinal section of an automobile equipped with my invention. Figure 2 is a top plan view of the frame of this automobile provided with my improvements in connection with the front and rear bumpers or buffers. Figure 3 is a fragmentary vertical longitudinal section, on an enlarged scale, showing one form of my invention interposed between the front bumper or buffer bar and one of the front horns of the main frame or chassis. Figure 4 is a vertical transverse section, taken on line 4—4, Fig. 3. Figure 5 is a detached perspective view of the bracket and the tubular body forming part of the indicating device. Figure 6 is a similar view of a clip suitable for attaching this bracket to the frame.

Similar characters of reference refer to like parts throughout the several views.

Although my invention may be embodied in various forms of automobiles or other vehicles, the same is shown in Figs. 1 and 2 in connection with single bumper bars 11, 12, arranged transversely at the front and rear ends of the chassis of the main frame 13 of an automobile. Each of these bumper or buffer bars is preferably of channel-shaped form in cross section and mounted upon the front and rear parts of the chassis or frame by means of my invention, so that upon pushing any part of one of these bars inwardly, an electric circuit will be closed, which will serve to operate an audible signal, such as the horn 14, now commonly employed on automobiles, as a warning signal. This horn, which may be of any suitable construction, has one side of its electric operated mechanism connected with a source of energy, such as a battery 15 while the opposite sides of this battery is mounted on the main frame of the machine. The circuit of this audible signal horn also contains a switch 16 whereby the horn may be cut out and prevented from sounding in the event that the circuit is accidentally closed by a disarrangement of the parts, thereby preventing the battery from being run down and the horn from being an annoyance.

The means for mounting the bumper or buffer bar on the automobile frame and the means for closing the electric circuit and sounding the horn 14 when the front bumper bar 11 is pushed inwardly, may be variously constructed, that for example shown in Figs. 1, 2, 3, 4 and 5 being constructed as follows:

17, 17 represent two brackets, each of which is secured upon the front end of the horn 18 on one of the side bars of the frame by means of a rear clip 19 which fastens the rear part of this bracket to the frame horn and a front clip 20 which fastens the front part of this bracket to the bolt 21, whereby the adjacent spring 22 is pivotally connected with this horn. Extending forwardly from each of the brackets 17 is a horizontal tubular body 23, the rear part of which contains a rear wall or partition 24, while the front part thereof is constructed so as to form an internal outwardly facing shoulder 25. Mounted in the partition 24, but insulated therefrom, is a relatively fixed electric contact 26 which is connected by means of a wire 27 with that side of the electric actuating mechanism of the horn 14 which is opposite to the connection of the same with the battery 15. This conducting wire 27 extends through the rear part of the bracket 17, which is made hollow, and also through the adjacent hollow part of the automobile frame whereby the same is concealed and protected against injury.

Arranged within the tubular body 23 and movable lengthwise therein is a movable contact 28 of metal which is adapted to move inwardly into engagement with the fixed contact 26 for the purpose of closing the electric circuit which includes the horn 14 and the battery 15 and also to move outwardly away from the fixed contact for the purpose of breaking the circuit and thereby either sounding or silencing this horn. Between the fixed and movable contacts 26 and 28 is arranged a comparatively light spring 29 which engages its inner end with the partition or wall 24 and its outer end with the inner side of the contact 28.

30 represents a horizontal longitudinal plunger which is adapted to reciprocate lengthwise with its inner part in the outer part of the tubular body 23 and is confined against outward movement in this body by means of an outwardly facing shoulder 31 formed thereon and engaging with a stop which is arranged on the adjacent part of the tubular body and preferably consists of a screw ring or plug 32 engaging with the outer part of the bore of the tubular body 23 and abutting at its inner end against the shoulder 25 on said body and the shoulder 21 on the plunger.

The outer end of each of the plungers projects into the concave or hollow side of the adjacent part of the front bumper or buffer and is pivotally connected by means of a vertical screw 33 or similar means so that this buffer bar is capable of turning in a horizontal plane on the plunger. Arranged within the central part of the tubular body 23 and engaging its outer and inner ends with the inner end of the plunger and the outer side of the contact 28 is a main cushion spring 34 which is heavier than the light contact spring 29.

Upon mounting a single bumper or buffer bar upon the front end of an automobile frame in this manner, this bar will normally be held in its projected position by means of the two light springs, each of which is arranged between one of the fixed contacts 26 and the companion movable contact 28, at which time the respective heavy springs 34 are fully expanded and in effect operate as extensions of the plunger, so that the shoulders 31 on the latter engage with the stop rings 32 on the tubular body 23 and thereby retain the bumper or bumper bar 11 in its outermost projected position.

At this time, the contacts 26 and 28 are separated so that the circuit through the horn 14 and battery 15 is broken and no signal is given. If however, either one or both ends of the front buffer bar 11 are moved inwardly by engagement with a part of another automobile or other object, the first effect of this movement is to cause one or both of the plungers to move inwardly in unison with one or both of the movable contacts 28, due to the fact that the heavy springs 34 are practically rigid at this time, during which movement the light springs 29 are compressed and one or both of the movable contacts 28 are engaged with the respective fixed contacts 26, so that the electric circuit through the horn and the battery is closed and an alarm will be given which will notify the driver of the car that his front buffer or bumper bar has come in contact with an adjacent object and thereby serves to give a warning that care must be given in the further manipulation of the car. If the inward movement of the buffer bar at one or both ends should continue after either one of the light springs 29 has been compressed and the adjacent fixed and movable contacts have been engaged, either one or both of the heavy springs 34 will also be compressed in proportion to the extent of continued inward movement of the buffer bar and thereby operate to cushion the effect of the collision of this bar with an adjacent object and preventing, or at least reducing, the damage which otherwise might occur. When the automobile is subsequently moved in a direction for carrying the front buffer bar away from the object with which the same collided, then the heavy main spring and the light contact spring will again expand into their normal position and restore the front buffer bar to its outermost position.

Instead of providing the inner end of the tubular body 23 with a bracket 17 which is mounted endwise upon a horn of the main frame, this body may be provided at its inner end with a bracket 35 which is secured sidewise to the longitudinal bars of the frame, as shown in connection with the rear bumper bar 12 of the automobile in Figs. 1 and 2, but in other respects the mechanism associated with this body may be in all respects like that shown and described in connection with the mechanism illustrated in Figs. 3 and 4, so that when the rear buffer or bumper bar 12 is pushed inwardly by engagement of this bar with another automobile or some object, the electric circuit of the horn 14 and battery 15 will be closed and thereby give an audible electric signal which will notify the driver of the dangerous position in which he is and thus enable him to avoid danger either to his own car or that of another.

Obviously, the buffers can be omitted and the outer end of the plunger may be engaged directly with another automobile or object for the purpose of pushing this plunger inwardly and detecting the collision with another object by closing the electric circuit of the horn, as a result of this collision and thus warning the driver to be careful.

While the frame or chassis of the automobile, as shown in Figs. 1–4 is an appropriate place on which this collision indicating device may be mounted, it is to be understood that any other suitable available place on an automobile or similar vehicle might be utilized for mounting the same, the essential principle underlying this invention consisting of means whereby an audible signal is given when the automobile collides or comes in contact with another object to a sufficient extent to actuate the parts which operate the electric or other type of audible signal.

Aside from being comparatively simple in construction, this device can be easily applied to all well known types of automobiles now in use without requiring any particular skill. Furthermore, this device is not delicate nor liable to get out of order, but instead is sturdy and will remain in operative condition notwithstanding the exposure to the weather to which the same may be subjected.

I claim as my invention:

1. A collision indicating device for an automobile having a chassis, and a bumper movably mounted on said body, comprising a rear tubular fixed body adapted to be mounted on the chassis and provided with a rear head, a fixed electric contact mounted on said rear head, but insulated therefrom, a movable contact guided in said tubular body and adapted to move into and out of engagement with said fixed contact, a light spring arranged within said body and bearing at its opposite ends against the front side of said rear head and the rear side of said movable contact, a movable plunger guided lengthwise in the front part of said body and adapted to be moved rearwardly by said bumper, and a heavy spring arranged in said tubular body and interposed between said movable contact and said plunger.

2. A collision indicating device for an automobile having a chassis and a bumper movably mounted on said body, comprising a rear tubular fixed body adapted to be mounted on the chassis and provided with a rear head, a fixed electric contact mounted on said rear head but insulated therefrom, a movable contact guided in said tubular body and adapted to move into and out of engagement with said fixed contact, a light spring arranged within said body and bearing at its opposite ends against the front side of said rear head and the rear side of said movable contact, a movable plunger guided lengthwise in the front part of said body and adapted to be moved rearwardly by said bumper, a heavy spring arranged in said tubular body and interposed between said movable contact and said plunger, and stop means for limiting the forward movement of said plunger relatively to the body.

LOUIS LIFSCHUTZ.